Figure 3:
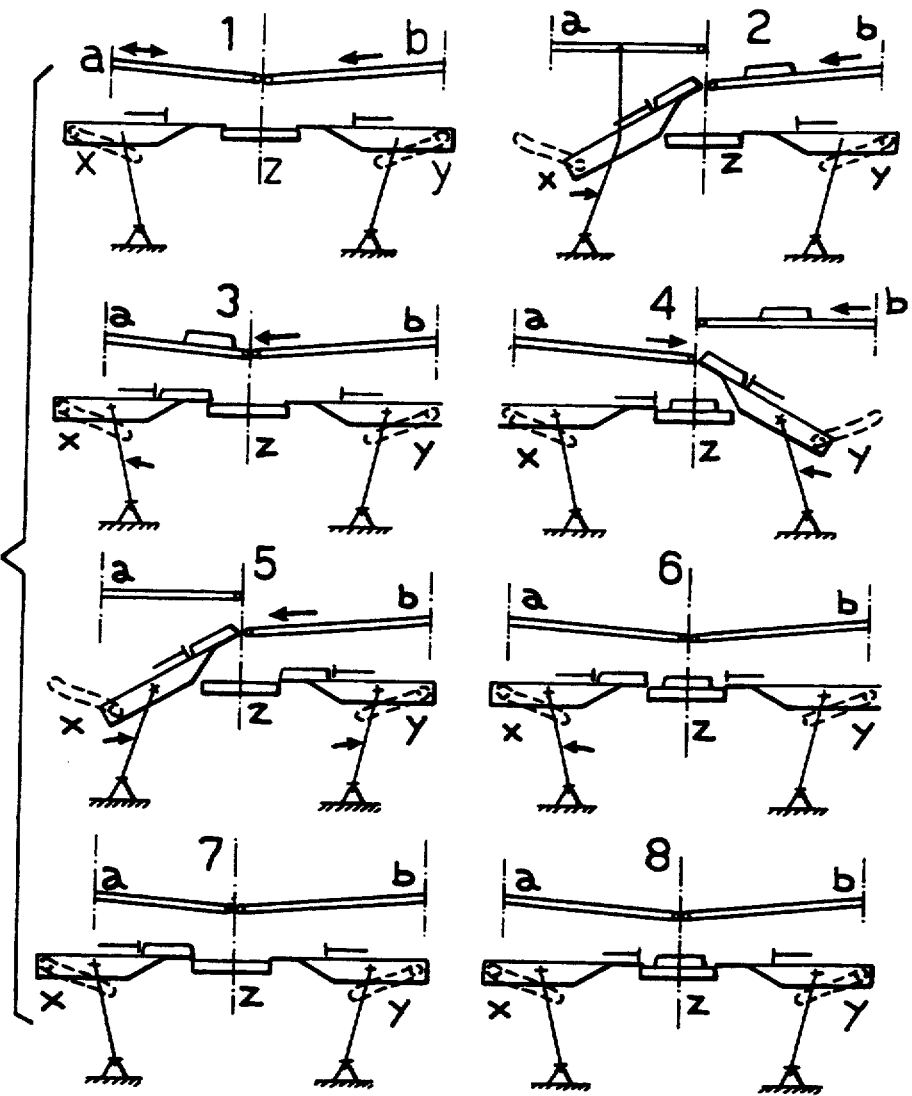

United States Patent [19]
Moeller

[11] Patent Number: 5,429,223
[45] Date of Patent: Jul. 4, 1995

[54] STATION FOR DISTRIBUTING PRODUCTS

[75] Inventor: Kurt Moeller, Ferrara, Italy

[73] Assignee: MOPA S.r.l., Ferrara, Italy

[21] Appl. No.: 320,600

[22] Filed: Oct. 11, 1994

Related U.S. Application Data

[63] Continuation of Ser. No. 109,675, Aug. 20, 1993, abandoned.

[30] Foreign Application Priority Data

Aug. 26, 1992 [IT] Italy ............................. BO92A0303

[51] Int. Cl.[6] ............................................. B65G 47/46
[52] U.S. Cl. ............................. 198/369.1; 198/371.2
[58] Field of Search ........................ 198/369, 371, 433

[56] References Cited

U.S. PATENT DOCUMENTS

| | | | |
|---|---|---|---|
| 4,282,964 | 8/1981 | Hogenkamp et al. | 198/369 |
| 4,324,522 | 4/1982 | Buccicone | 198/369 |
| 4,541,824 | 9/1985 | Muller | 198/371 |
| 5,287,952 | 2/1994 | Redaelli | 198/369 |

FOREIGN PATENT DOCUMENTS

3496/74 10/1974 Italy .
3524/76 8/1976 Italy .

Primary Examiner—Joseph E. Valenza
Attorney, Agent, or Firm—Knobbe, Martens, Olson & Bear

[57] ABSTRACT

A station for distributing products to a line for supplying packaging machines or for storage, if necessary, comprises a first conveyor having an end which is driven so as to oscillate between a raised configuration and a lowered, receiving configuration in which it is aligned with the output of a product-conveyor line and is disposed above the center-line of a line perpendicular thereto for supplying a packaging machine, and a first product-transfer unit which is aligned with and below the first conveyor and is driven in an oscillatory manner in order to move its input from a collecting position in which it is aligned with the product-conveyor line while the first conveyor is in the raised configuration, to a discharge position in which it is coplanar with the supply line. A second conveyor and a second transfer unit for any storage that may be necessary are disposed specularly on the opposite side of the supply line to act, respectively, as a conveyor line for the first conveyor and as a unit for transferring to the supply line the products previously accumulated on the first conveyor which is simultaneously driven in the opposite direction.

4 Claims, 2 Drawing Sheets

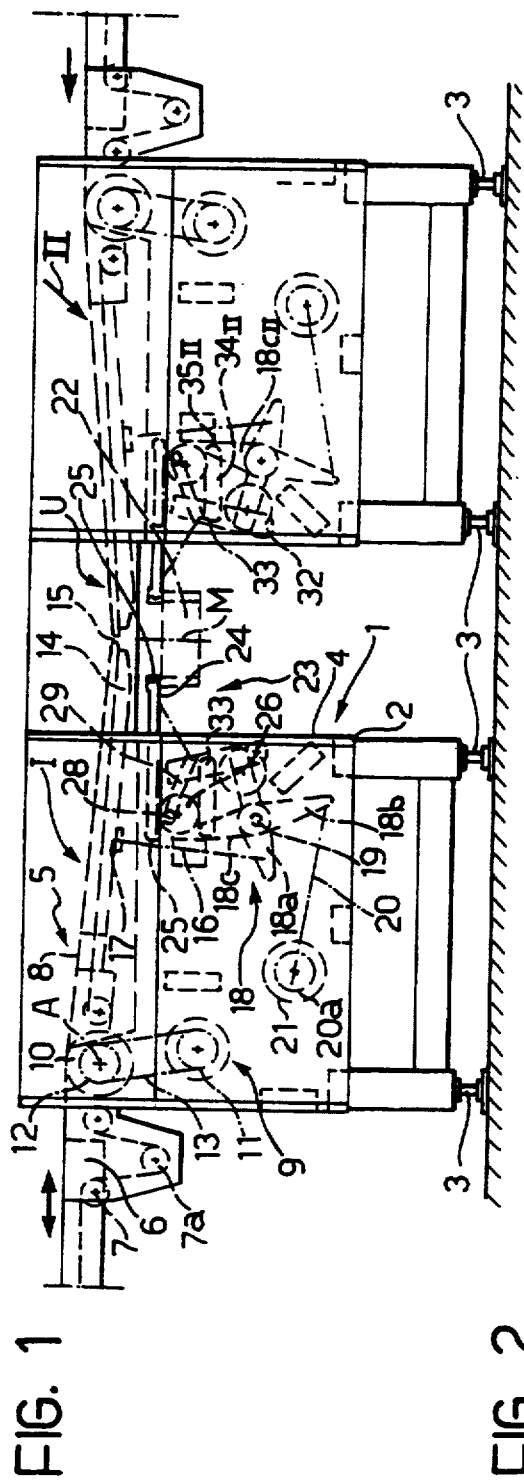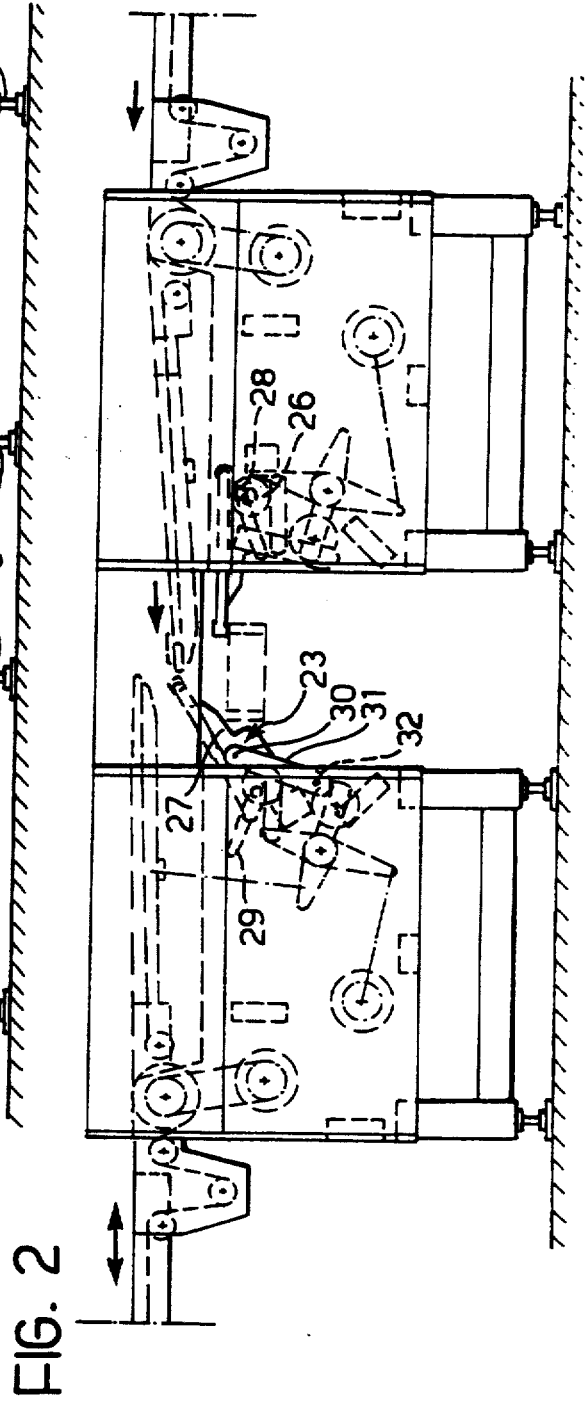

STATION FOR DISTRIBUTING PRODUCTS

This application is a continuation of application Ser. No. 08/109,675, filed Aug. 20, 1993 now abandoned.

DESCRIPTION

The subject of the present invention is a station for distributing products adapted, in use, to operate between a product conveyor line and a line perpendicular thereto for supplying a packaging machine.

Equipment for processing products such as bars and slabs of chocolate, snacks, sweets or the like, in which the products which come from a production line disposed in spaced-apart transverse lines or rows have to be sent to packaging lines where the products must arrive aligned one behind the other, is known; the operating speed of the packaging machines is often decidedly less than the production speed and a single production line therefore supplies a plurality of packaging lines; in particular, equipment is known in which the line of products coming from the production line is disposed slightly above and perpendicular to a multiplicity of lines for supplying the packaging machines.

In order to transfer the rows of products onto the packaging lines, devices are known in which, in correspondence with each packaging line, there are portions of production line of which the sides directed to the receipt of the products can be made to oscillate to a raised, disengaged configuration whilst the oscillating end of a lower transfer device is raised to the level of the production line in a coordinated manner and, in the raised position, receives a row of products and is then lowered no the level of the packaging line; means are then provided for discharging the product previously collected onto the packaging line.

As mentioned briefly, a production line supplies many packaging lines and the number of packaging machines is arranged to exceed the production requirements; however, in certain circumstances, the packaging lines cannot dispose of all the rows of products coming from the production line; this may occur during short stoppages for changing the packaging material, or at certain times when some packaging machines are stopped for small maintenance operations or because of some breakdown thereof.

In these cases, it is necessary for a packaging line to have a station which stores the products coming from the production line and which can subsequently resupply the products go a packaging machine.

Distribution stations produced at the moment are unsuitable for the requirements off the production system described above.

The technical object of the present invention is to solve the stated problems of the known devices, that is, to provide a station for distributing products to a line for supplying packaging machines, which is perfectly adapted to the operating cycles of the packaging machines and which can store excess products at certain times if necessary.

Within the scope of this technical object, another object of the present invention is to achieve the aforesaid object by means of a simple structure which can be produced quite easily, which is safe in use and effective in operation, and which is also quite cheap.

This and other objects are all achieved by the present station for distributing products having the features set forth in the annexed claim 1.

Figure 4:
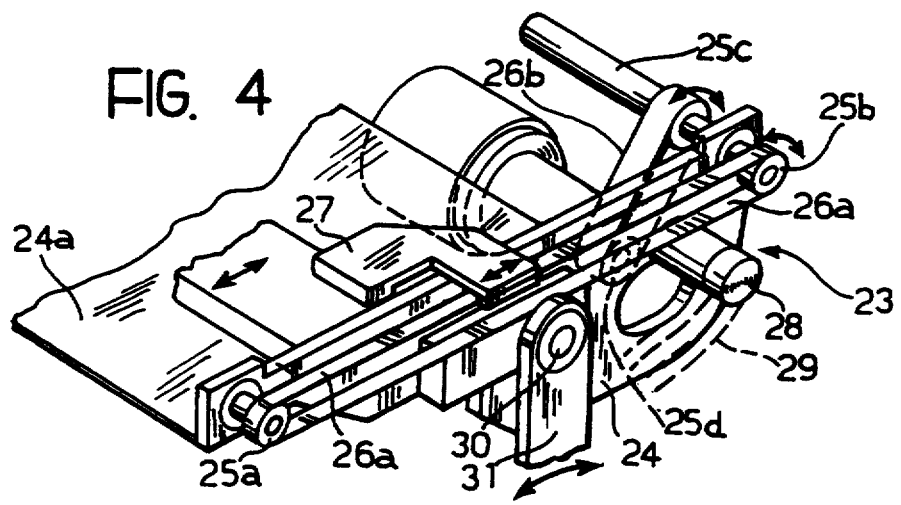

Further details and advantages will become clearer and more evident from the detailed description of a preferred, but not exclusive, embodiment of a station according to the invention for distributing products to a line for supplying packaging machines or for storage if necessary, which is shown by way of non-limiting example in the appended drawings, in which:

FIG. 1 is a side view of a distribution and storage station according to the invention, FIG. 2 is a side view of the station of FIG. 1 in a different operating stage, on a reduced scale, FIG. 3 shows a sequence of different operating conditions of the station, on a very small scale, and FIG. 4 is a perspective view of the transfer unit of the station according to the invention, on an enlarged scale.

With particular reference to the drawings, the station according to the invention, for distributing products to a line for supplying packaging machines or for storage if necessary, is generally indicated 1.

The station 1 is supported on a parallelepipedal base 2 having at least four legs 3 with adjustable feet; a frame 4 is fixed to the base 2 and its upper portion supports a first conveyor belt 5; the belt 5 has an elongate support 6 which carries a series of idle rollers 7 with tensioners 7a, around which an endless belt 8 is wound; the belt is driven, by means of a coupling with gears 11, 12 and an endless toothed belt 13, by a drive unit 9 which is connected to a drive roller 10 around which the belt is wound.

The extension 14 of the support 6, with a respective roller 15 around which the belt 8 is wound, is driven so as to oscillate about a horizontal axis A, by means of a rod 16 of which the top is articulated to a pin 17 on the extension 14 and the bottom is articulated to an arm 18a of a lever mechanism 18 formed essentially like a Greek cross; the lever mechanism 18 is mounted for free rotation on bearings 19 about a transverse axis of the frame 4; an arm 18b of the lever mechanism 18 is articulated to one end of a tie rod 20, the other end of which is articulated to a disc 20a which is rotated by a motor unit, schematically indicated 21; the rotation of the disc 20a can bring the end 15 from a raised configuration to a lowered receiving configuration.

The end 15 is aligned with the output U of a product-conveyor line and is disposed above the centre-line, indicated M, of a line or belt 22 perpendicular thereto, for supplying a packaging machine.

A first product-transfer unit, generally indicated 23, is parallel to and beneath the belt, and is driven in an oscillatory manner, moving downwardly and rearwardly in order to move its input from a collecting position in which it is aligned with the product-conveyor line, whilst the belt is in the raised configuration, to a lateral-discharge position in which it is perpendicular to and coplanar with the supply line.

The unit 23 is constituted by a small frame 24 the top of which fixedly carries a plate 24a for collecting products by sliding; two pairs of pulleys 25a, 25b, 25c, 25d with horizontal axes are rotatable on one side of the frame 24 and first and second endless toothed belts 26a, 26b are wound around them; the pulleys 25b and 25c are coaxial and are fixed together and the pulley 25d is driven by a motor-reduction unit 25g; a thrust element 27 for the products is fixed laterally to one pass of the belt 26a; there may be a movable belt above the plate 24a for facilitating the loading and discharge of the produces.

The rear of the small frame 24 carries a lower idle roller 28 which is slidable along a shaped guide 29; the upper end of a rod 31 is associated with an external, horizontal pin 30 in a central position beneath the small frame 24, the rod having a lower end which is articulated to a pin 32 fixed transversely to the frame 4; the end of a connecting rod 34 is articulated in an intermediate position to the rod 31 by a pin 33 and its other end is articulated to the arm 18c of the Greek-cross-shaped lever mechanism 18 by a pin 35; the rotation of the Greek-cross-shaped lever mechanism in one sense and in the opposite sense causes the small frame to oscillate between the collecting position and the discharge position; the motor unit 25g is driven in one sense to clear the space on the plate 2a for the sliding of the products and is then driven in the opposite sense with the small frame 24 in the lowered position in order to release the products onto the line 22.

It should be noted that the simultaneous raising movements of the small frame 24 and the extension 14 are always in phase since they are brought about by a single motor unit.

A second belt and a second unit, identical to the first ones described above and indicated by the Roman numeral II, are disposed specularly symmetrically with respect to the median plane M for any storage that may be necessary and can act, respectively, as a conveyor line for the first belt and as a unit for transferring to the supply line products previously accumulated on the first belt, which is simultaneously driven in the opposite direction.

FIG. 3 shows schematically various operating situations which may arise; the first and second conveyor belts are indicated a and b, and the first and second units for transferring products onto a supply line z for a packaging machine are indicated x and y; the situations are as follows:

1—the starting condition;
2—the belt is raised simultaneously with the first unit x, which is moved to the position for collecting the row of products coming from b (production);
3—the first unit x is lowered to the level of z; at the same time, the belt a is lowered and is positioned for collecting the next row of products,
4—the row of products on x is transferred onto the line z whilst the second collecting unit y is brought to the raised configuration for collecting the row of products on a;
5—the second unit y is lowered to the level of z whilst the first unit x is raised to the configuration for collecting the row of products coming from b; at the same time, the products on the line z are moved away;
6—the row of products on y is transferred to z whilst the first unit x is lowered to the level of z;
7—the row of products on the line z is moved away;
8—the row of products on the first unit x is transferred to the line z.

The first belt a can be driven in opposite directions according to whether it is acting as a store for products coming from b or whether it is to dispose of the products previously stored. The various operating members are subservient to photocells which detect the presence of the products on the various members.

It has thus been seen that the invention achieves the objects set. The invention thus conceived may undergo many modifications and variations all of which fall within the scope of the inventive concept.

Moreover, all the details may be replaced by others which are technically equivalent.

In practice, it is possible to use any materials, as well as any shapes and dimensions, according to requirements, without thereby departing from the scope of the protection of the following claims.

What is claimed is:

1. A station for distributing products, adopted, in use, of operating between a product-conveyor line and a line perpendicular thereto for supplying a packaging machine, wherein the station comprises a first conveyor having one end which is driven so as to oscillate between a raised configuration and a lowered, receiving configuration in which it is aligned with the output of said product-conveyor line and is disposed above the centre-line of said supply line, and a first product-transfer unit which is aligned with the first conveyor and is driven in an oscillatory manner, in order to move its input from a collecting position in which it is aligned with said product-conveyor line, whilst the first conveyor is in the raised configuration, to a discharge position in which it is coplanar with said supply line and wherein the station further comprises a second conveyor and a second product-transfer unit for any storage that may be necessary, the second conveyor and the second unit being disposed specularly relative to the first conveyor and the first unit on the opposite side of said supply line, to act, respectively, as a conveyor line for the first conveyor and as a unit for transferring to said supply line products previously accumulated on the first conveyor which is simultaneously driven in the opposite direction.

2. A station according to claim 1, including an operating rod articulated at its top to the oscillating end of the first conveyor in an intermediate position.

3. A station according to claim 1, wherein the first product-transfer unit comprises a collecting plate, a frame on which the collecting plate is mounted, a shaped rod along which the rear of the frame is slidable, and a rod to which the frame is articulated in a central position and which is articulated to the base of the station.

4. A station according to claim 1, wherein:
the station includes an operating rod articulated at its top to the oscillating end of the first conveyor in an intermediate position;
the first product-transfer unit comprises a collecting plate, a small frame on which the collecting plate is mounted, a shaped rod along which the rear of the frame is slidable, and a rod to which the frame is articulated in a central position and which is articulated to the base of the station; and
the station also includes a Greek-cross-shaped lever mechanism having a first arm to which the bottom of the operating rod is articulated, a second arm, a connecting rod which is articulated to the rod of the first product-transfer unit and to the said second arm, a third arm, a motor unit, and a tie-rod of which one end is articulated to the said third arm and the other end is driven by the motor unit to rotate the lever mechanism in opposite senses and hence to oscillate the said end of the first conveyor and the first product-transfer unit.

* * * * *